(12) United States Patent
Kern et al.

(10) Patent No.: US 7,627,775 B2
(45) Date of Patent: Dec. 1, 2009

(54) MANAGING FAILURES IN MIRRORED SYSTEMS

(75) Inventors: Robert Frederic Kern, Otter Rock, OR (US); Gail Andrea Spear, Tucson, AZ (US); David B. Petersen, Great Falls, VA (US); Gregory Edward McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/302,348

(22) Filed: Dec. 13, 2005

(65) Prior Publication Data

US 2007/0168713 A1 Jul. 19, 2007

(51) Int. Cl.
*G06F 11/00* (2006.01)

(52) U.S. Cl. .......................................................... 714/6
(58) Field of Classification Search ....................... 714/6
See application file for complete search history.

(56) References Cited

U.S. PATENT DOCUMENTS

| 5,764,903 | A | 6/1998 | Yu |
| 5,911,038 | A | 6/1999 | Jones |
| 6,502,205 | B1 | 12/2002 | Yanai et al. |
| 6,820,098 | B1 | 11/2004 | Ganesh et al. |
| 7,330,948 | B2* | 2/2008 | Deguchi et al. ............. 711/162 |
| 2003/0195903 | A1 | 10/2003 | Manley et al. |
| 2005/0050286 | A1 | 3/2005 | Crowley et al. |
| 2005/0071585 | A1 | 3/2005 | Hayardeny et al. |
| 2005/0071708 | A1 | 3/2005 | Bartfai et al. |
| 2005/0081091 | A1 | 4/2005 | Bartfai et al. |
| 2005/0102582 | A1* | 5/2005 | Fuente et al. .................. 714/42 |
| 2005/0172166 | A1* | 8/2005 | Eguchi et al. .................. 714/20 |
| 2006/0248381 | A1* | 11/2006 | Fujita et al. ..................... 714/6 |

OTHER PUBLICATIONS

IBM Corporation, "IBM: What's New With GDPS?" [online] © 2005 IBM Corporation, [Retrieved on Oct. 23, 2005], retrieved from the Internet at <URL: http://www-03.ibm.com/servers/eserver/zseries/gdps/offerings/1, pp. 1-3.
IBM Corporation, "IBM Storage Infrastructure for Business Continuity" © 2005 IBM Corporation, IBM Systems & Technology Group, Oct. 11, 2005, pp. 1-41.
IBM Corporation, "GDPS: The e-business Availability Solution", © 2005 IBM Corporation, Mar. 2005, pp. 1-29.
IBM Corporation, "GDPS Family—An Introduction to Concepts and Capabilities", © 2005 IBM Corporation, International Technical Support Organization, Oct. 2005, pp. 1-128.

* cited by examiner

*Primary Examiner*—Scott T Baderman
*Assistant Examiner*—Jigar Patel
(74) *Attorney, Agent, or Firm*—David W. Victor; Konrad Raynes & Victor LLP (57) ABSTRACT

Provided are a method, system and program from for managing failures in a mirrored system. A copy relationship between primary and secondary storage locations, wherein updates to the primary storage locations are copied to the secondary storage locations. A failure is detected preventing an application from writing updates to the primary storage locations. A failure message is received for the application in response to detecting the failure, wherein the failure message is not provided to the application. The copying of updates to the primary storage locations to the secondary storage locations is suspended. The failure message is provided to the application in response to suspending the copying.

27 Claims, 6 Drawing Sheets

FIG. 1

PRIOR ART

MANAGING FAILURES IN MIRRORED SYSTEMS

BACKGROUND OF THE INVENTION

1. Field of the Invention

The present invention relates to a method, system, and program for managing failures in mirrored systems.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy. These different copy technologies are described in the IBM publications "The IBM TotalStorage DS6000 Series: Copy Services in Open Environments", IBM document no. SG24-6783-00 (September 2005) and "IBM TotalStorage Enterprise Storage Server: Implementing ESS Copy Services with IBM eServer zSeries", IBM document no. SG24-5680-04 (July 2004).

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain backup system, a sysplex timer is used to provide a uniform time across systems so that updates written by different applications to different primary storage devices use consistent time-of-day (TOD) value as a time stamp. Application systems time stamp data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of previous data writes is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group. Consistency groups are formed within a journal device or volume. From the journal, updates gathered to from a consistency group are applied to the secondary volume. If the system fails while updates from the journal are being applied to a secondary volume, during recovery operations, the updates that did not complete writing to the secondary volume can be recovered from the journal and applied to the secondary volume.

Certain applications, such as database applications, may write user data to one set of primary volumes in a session and write exception information to another set of primary volumes in another or the same session. If a failure occurs such that the application cannot continue to write to the primary volumes including the user data, the application may still be able to write exception information on the failure to different primary volumes having the exception information and this failure exception information may be propagated to the secondary volumes mirroring the exception information. In such case; the secondary volumes have error free user data, however the exception information for the user data in the secondary volumes indicates that a failure occurred. During failure recovery operations, the administrator must perform extensive recovery operations at the secondary site to correct this data discrepancy in the mirrored copy because the secondary copy of the exception information indicates a failure or error that is not reflected in the mirrored user data.

For these reasons there is a need in the art for improved techniques for handling failures in a mirrored environment.

SUMMARY

Provided are a method, system and program from managing failures in a mirrored system. A copy relationship between primary and secondary storage locations, wherein updates to the primary storage locations are copied to the secondary storage locations. A failure is detected preventing an application from writing updates to the primary storage locations. A failure message is received for the application in response to detecting the failure, wherein the failure message is not provided to the application. The copying of updates to the primary storage locations to the secondary storage locations is suspended. The failure message is provided to the application in response to suspending the copying.

In a further embodiment, a data mover asynchronously copies updates to the primary storage locations to the secondary storage locations in the relationship.

In a further embodiment, the detected failure comprises a failure of at least one of a storage device in which the primary storage locations are configured, a control unit providing access to the storage device, or a component in a fabric providing communication between the application and the storage device.

In a further embodiment, the failure message is generated by a host operating system including the application or a control unit operating system managing access to the primary storage locations.

In a further embodiment, the primary and secondary storage locations comprise first primary and secondary storage locations. The application further writes exception information to second primary storage locations that is copied to second secondary storage locations. The detected failure comprises a failure related to an accessibility of the first primary storage locations, and wherein suspending the copying of updates prevents information on the detected failure written to the exception information in the second primary storage locations from being copied to the second secondary storage locations.

In a further embodiment, updates not copied from the primary storage locations to the secondary storage locations are journaled during the suspension. A data recovery operation is performed by copying the data at the secondary storage locations to primary storage locations and the journaled updates are applied to the primary storage locations in response to copying the data at the secondary storage locations to the primary storage locations.

In a further embodiment, the failure is detected with respect to a first set of primary storage locations. The first set of primary storage locations and a second set of primary storage locations are in one consistency group. The suspension of copying of updates applies to copying updates to the first and second sets of primary storage locations to a corresponding first and second sets of secondary storage locations.

In a further embodiment, the suspension of copying does not apply to copying updates to a third set of primary storage locations to a corresponding third set of secondary storage locations. The third set of primary storage locations are not in the consistency group including the first and second sets of primary storage locations.

In a further embodiment, the first and second set of primary and secondary storage locations comprise different sessions. A first data mover is used to copy updates to the first set of primary storage locations to the first set of secondary storage locations and a second data mover is used to copy updates to the second set of primary storage locations to the second set of secondary storage locations.

In a further embodiment, I/O requests to the primary storage locations are quiesced in response to detecting the failure. The I/O requests are allowed to proceed against the primary storage locations in response to suspending the copying of the updates. Updates to the primary storage locations are indicated in response to allowing the I/O requests to proceed while the copying of the updates is suspended.

In a further embodiment, information related to the failure message is written to the primary storage locations during the suspension but is not copied to the secondary storage locations. The secondary storage locations do not include the information related to the failure message written to the primary storage locations.

DETAILED DESCRIPTION

Figure 1:
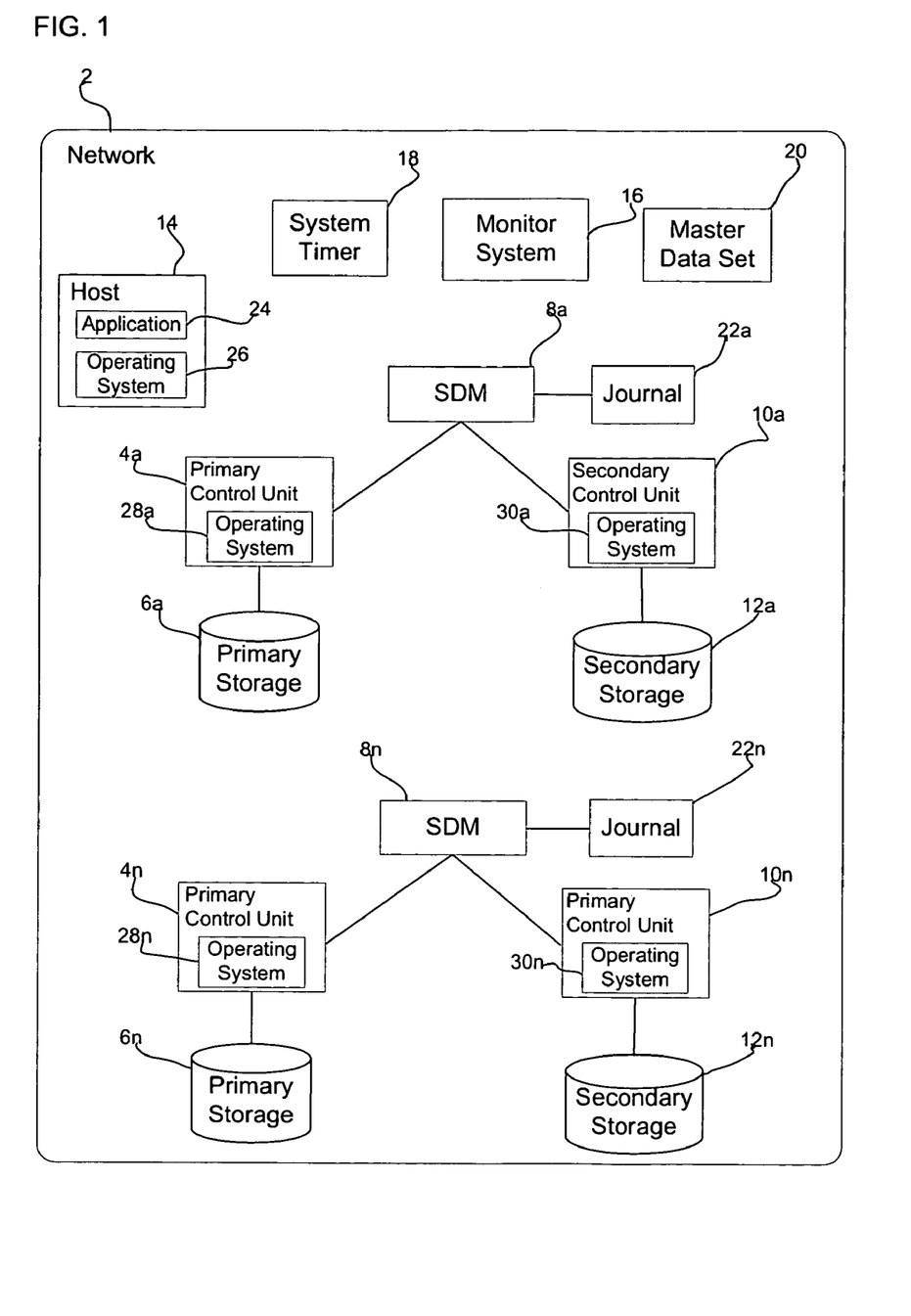
FIG. 1 illustrates an embodiment of a network computing environment.

FIG. 1 illustrates an embodiment of a network computing environment. A network 2 includes a plurality of primary control units 4a . . . 4n; primary storages 6a . . . 6n; data movers 8a . . . 8n managing the copying of updates to the primary storages 6a . . . 6n to the secondary control units 10a . . . 10n and corresponding secondary storages 12a . . . 12n; a host 14 writing updates to the primary storages 6a . . . 6n; a monitor system 16 monitoring failures in the availability of the primary storages 6a . . . 6n to the host 14; a system timer 18; and a master data set 20. The components 4a . . . 4n, 6a . . . 6n, 8a . . . 8n, 10a . . . 10n, 12a . . . 12n, 14, 16, 18, and 20 are connected to the network 2 and the network 2 enables communication among these components. The network 2 may include one or more switches to provide one or more paths of communication between the different network 2 elements.

System data mover (SDM) programs 8a . . . 8n read updates from the primary storages 6a . . . 6n and form consistency groups of updates from the primary storage 6a . . . 6n to write to the corresponding secondary storage 12a . . . 12n. At the primary control units 4a . . . 4n, updates may be written to a side file in a cache. The updates may then be transferred to journals 22a . . . 22n maintained by the SDMs 8a . . . 8n. Within each of the journals 22a . . . 22n, the updates are arranged into consistency groups. The journals 14a . . . 14n may store one or more consistency groups. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Consistency groups are formed within a session. A session may comprise the operations of a primary-secondary volume pairs managed by one or more SDMs 8a . . . 8n and the volume pairs managed by the mirror program 4. All volume pairs assigned to a session will have their updates maintained in the same consistency group. Thus, the sessions are used to determine the volumes that will be grouped together in a consistency group. If the system fails while updates from the journal 22a . . . 22n are being applied to a secondary volume, during recovery operations, the updates that did not complete writing to the secondary volume can be recovered from the journal and applied to the secondary volume.

The SDMs 8a . . . 8n may comprise programs implemented in a system. The SDMs 8a . . . 8n may be implemented at the primary control units 4a . . . 4n, secondary control units 10a . . . 10n or an independent site and system.

The master data set 20 includes a list of the sessions being managed and for each managed session, the time of the most recent update to a volume in such session. The master data set 20 may reside on volumes in the storages 6a . . . 6n, 12a . . . 12n. The journal data sets for a primary/secondary control pair may reside on any device. In FIG. 1, each SDM 8a . . . 8n is part of one session whose information is indicated in the master data set 20. Each session may be assigned one or more SDMs 8a . . . 8n.

The system timer 18 provides the time stamps for updates to insure that a common time is used across all SDMs 8a . . . 8n to provide a common time reference for application programs writing updates to volumes to insure that updates are not mirrored out-of-sequence. Once updates in the journal 22a . . . 22n are organized within a consistency group, then the updates within a consistency are applied to the secondary storages 12a . . . 12n. The creation of consistency groups guarantees that the system will shadow data to a remote site in real time with update sequence integrity for any type of data. Using consistency groups ensures that updates applied to the secondary storages 12a . . . 12n within a session are consistent as of the consistency time of the consistency group and consistent between sessions. If a failure occurs while updates are written from the journal 22a . . . 22n to secondary volumes in the secondary storage 12a . . . 12n, then during recovery, the updates that were interrupted during system failure can be recovered from the journal and reapplied to the secondary volume. In this way, data is insured consistent within and across sessions during recovery as of a point in time. The copy operations use the master data set 20 to maintain consistency across sessions, such as International Business Machine Corporation's ("IBM") Extended Remote Copy (XRC), Coupled XRC (CXRC), Global Copy, Global Mirror Copy, and synchronous mirroring such as Peer-to-Peer Remote Copy (PPRC).

The network 2 may comprise a Storage Area Network (SAN), Local Area Network (LAN), Intranet, the Internet, Wide Area Network (WAN), peer-to-peer network, arbitrated loop network, etc. The storages 6a . . . 6n, 12a . . . 12n may comprise an array of storage devices, such as a Just a Bunch of Disks (JBOD), Direct Access Storage Device (DASD), Redundant Array of Independent Disks (RAID) array, virtualization device, tape storage, flash memory, etc.

In certain embodiments, the host operating system 26 and the primary control unit operating systems 28a . . . 28n include code to communicate certain predefined error notifications to the monitor system 16 before the error notification is sent to the application 24. In this way, the monitor system 16 handles information on failures detected by the operating systems 26 and 28a . . . 28n before the application 24. The secondary control units 10a . . . 10n also include operating systems 30a . . . 30n.

The monitor system 16 may be implemented within one of the control units or in a separate system, such as shown in FIG. 1.

Figure 2:
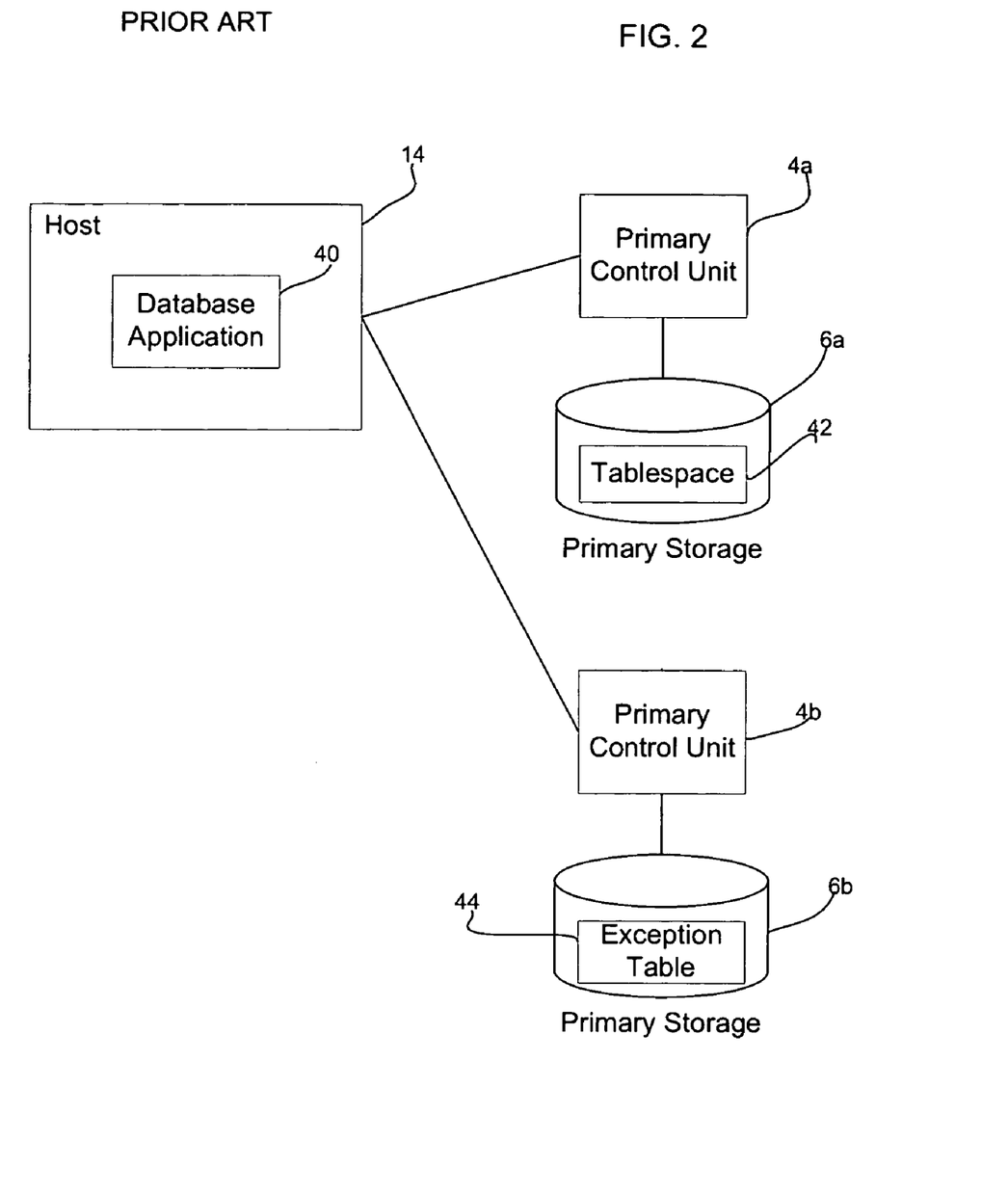
FIG. 2 illustrates an example of how a database application writes user data and exception information to two different primary storages in a manner known in the art.

The host 4 includes one or more applications 24 that communicate I/O requests to the primary control unit 4a . . . 4n. FIG. 2 illustrates an embodiment known in the prior art where the host 4 includes a database application 40. The database application writes user data, i.e., database records, to the primary storage 6a via the primary control unit 4a to update a database tablespace 42 storing the tables and records of the database. If the host 4 receives or detects a failure of the connection to the primary storage 4a or is unable to complete a write and signals the database application 40 of such error, then the database application 40 writes information on the error to an exception table 44 in primary storage 6b via primary control unit 4b.

Figure 3:
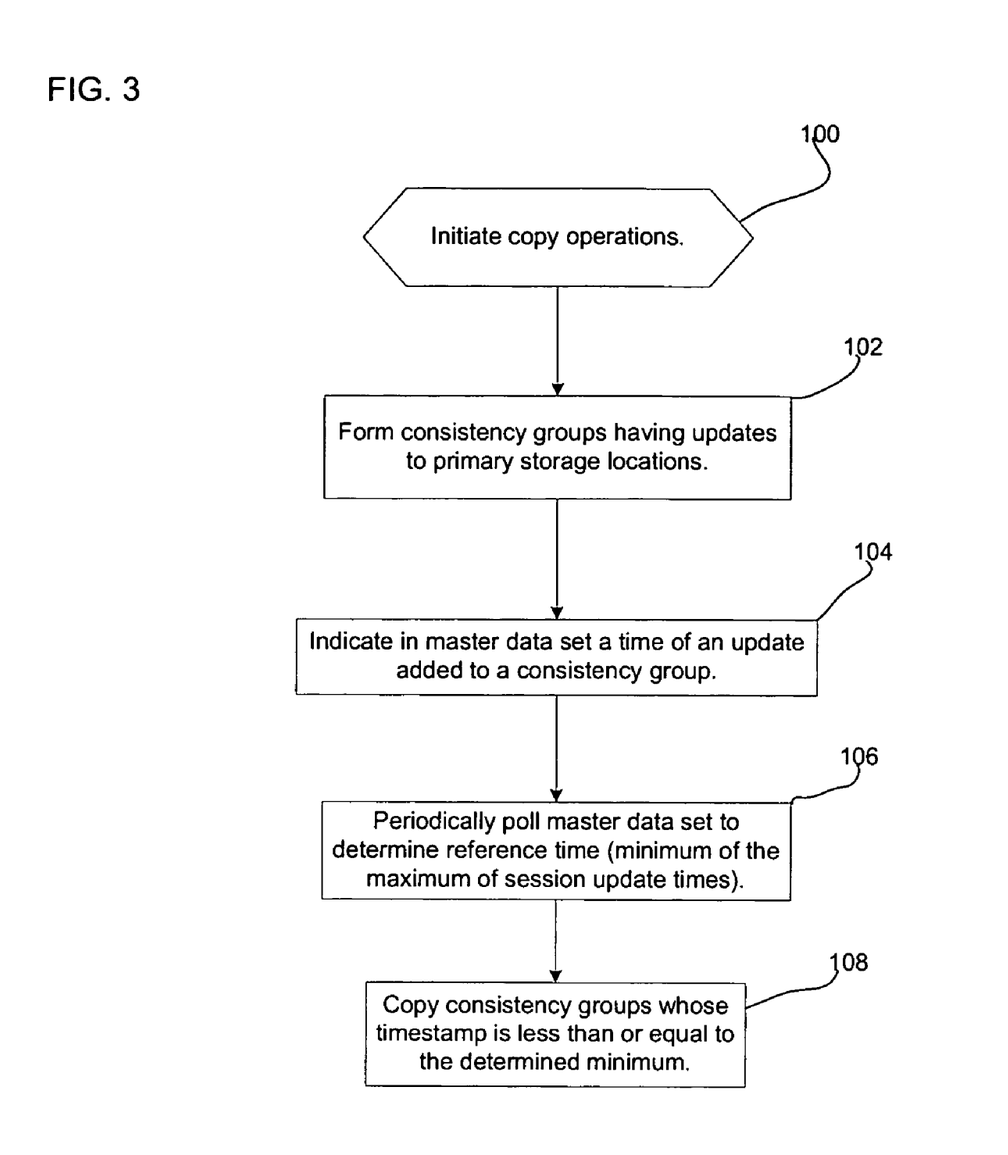
FIG. 3 illustrates an embodiment of operations to mirror a primary storage to a secondary storage.

FIG. 3 illustrates an embodiment of operations performed by the SDMs 8a . . . 8n copying data for different sessions using an asynchronous remote copy technology, e.g., XRC, CXRC, etc. In response to initiating remote copy operations (at block 100), the SDMs 8a . . . 8n form (at block 102) consistency groups having updates to primary storage locations. As discussed, the SDM 8a . . . 8n may form the consistency groups by reading the updates from the primary storages 6a . . . 6n to the journal 22a . . . 22n where the consistency group is formed. The SDMs 8a . . . 8n indicate (at block 104) in the master data set 20 a time of an update added to a consistency group in the journal 22a . . . 22n. The SDMs 8a . . . 8n may periodically poll (at block 106) the master data set 20 to determine a reference time (a minimum of the maximum of session update times). The SDMs 8a . . . 8n copy (at block 108) consistency groups in their journals 26a . . . 26n to the secondary storages 22a . . . 22n whose timestamp is less than or equal to the determined reference time. In an alternative embodiment, the data movers may synchronously copy data.

Figure 4:
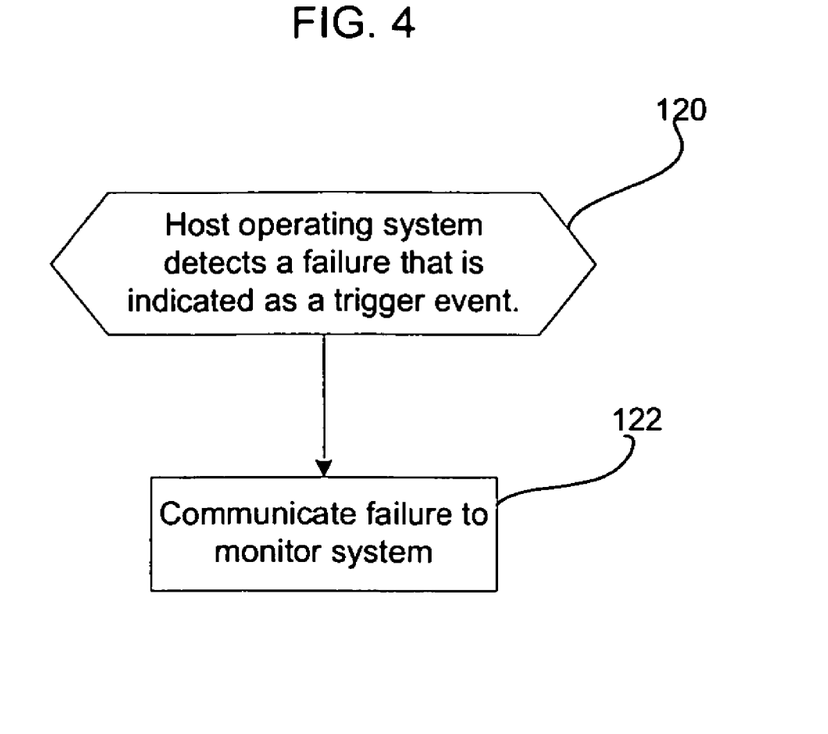
FIGS. 4 and 5 illustrate embodiments of operations to communicate a detected failure to a monitor system.

FIG. 4 illustrates an embodiment of operations performed by the host operating system 26 in response to detecting (at block 120) a failure that is a recognized trigger event to be handled first by the monitor system 16. In response to such detection, the host operating system 26 communicates (at block 122) the failure to the monitor system 16. The host operating system 26 may detect a failure in the network 2 connection, e.g., switches, cables, etc., between the host 14 and the primary control units 4a . . . 4n.

Figure 5:
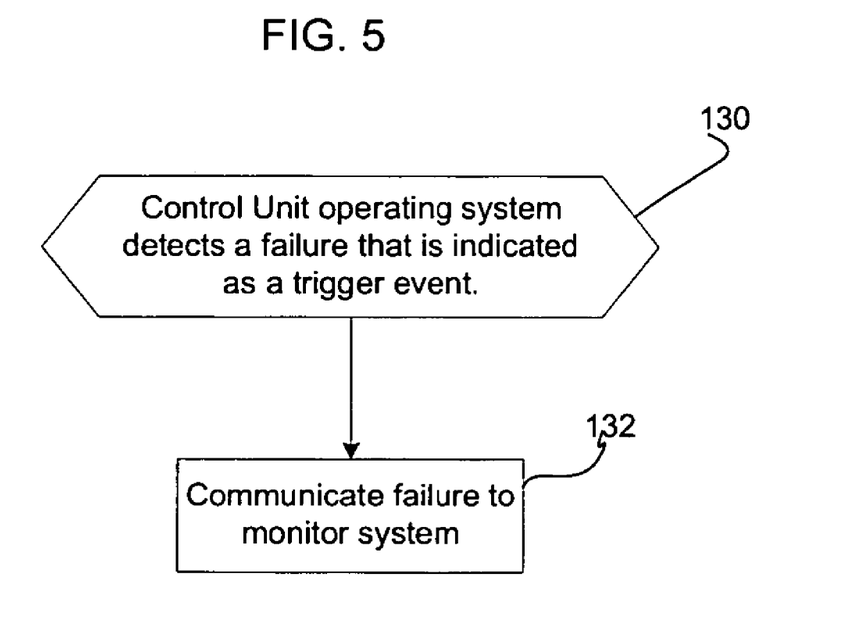

FIG. 5 illustrates an embodiment of operations performed by the primary control unit operating system 28a . . . 28n in response to detecting (at block 130) a failure that is a recognized trigger event to be handled first by the monitor system 16. In response to such detection, the control unit operating system 28a . . . 28n communicates (at block 132) the failure to the monitor system 16. The primary control unit operating systems 28a . . . 28n may detect a failure in the network 2 connection to the host 14 or a failure in the primary storage 6a . . . 6n resources, e.g., disk, array or tape failure, or a failure in the connection between the primary storages 6a . . . 6n and their respective primary control units 4a . . . 4n.

With the embodiments of FIGS. 4 and 5, a detected failure is intercepted by the monitor system 16 so that the monitor system 16 handles the failure message before the application 24 is notified of the failure. For instance, with respect to the database application 40, intercepting the failure and having it routed to the monitor system 16 prevents the database application 40 from writing information on the failure to the exception table 44, which in turn prevents information on the error/exception from being propagated to the secondary storage 12b mirroring the primary storage 4b having the exception table 44. In this way, the monitor system 16 may monitor numerous different types of failure notifications being generated in the network 2.

Figure 6:
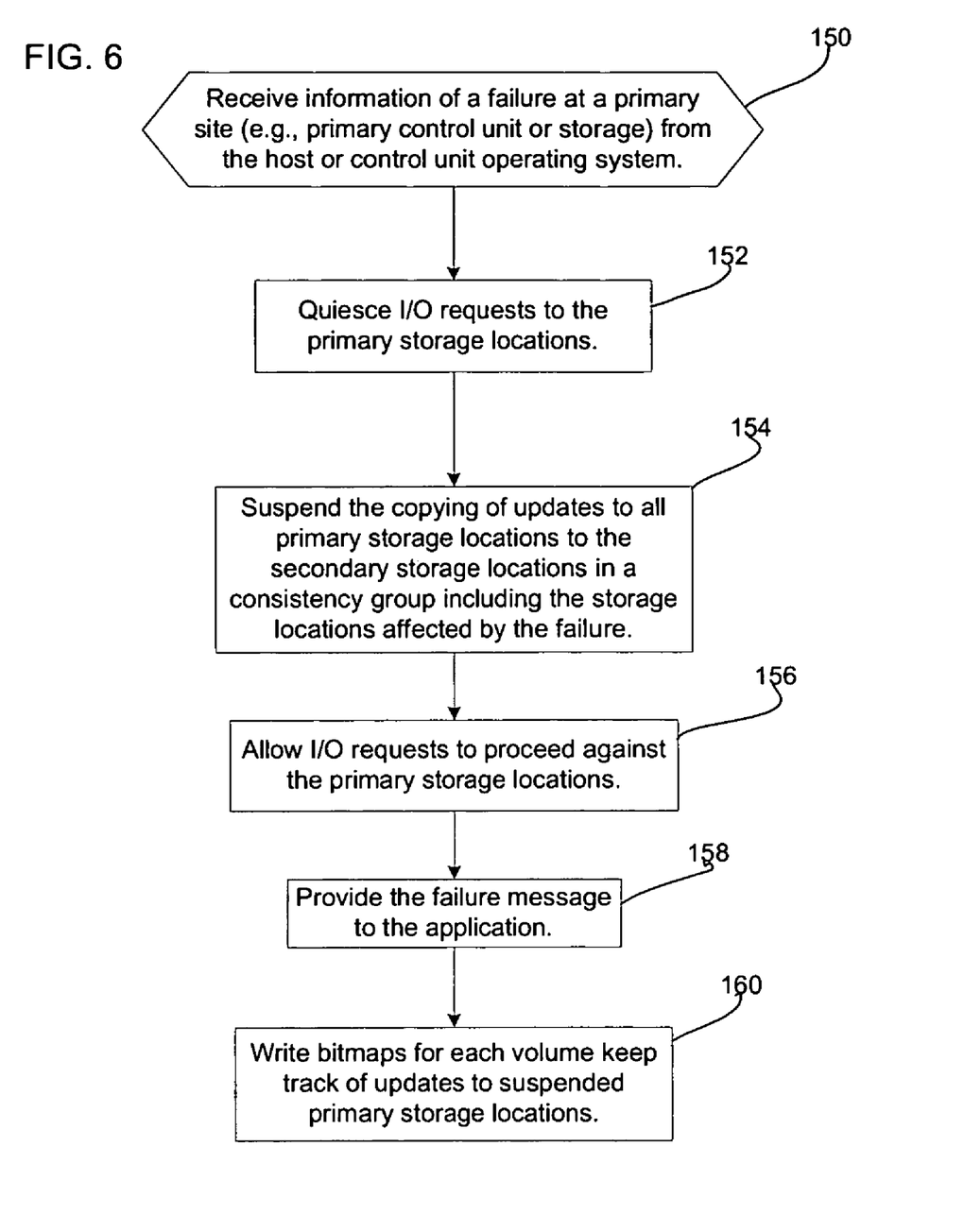
FIG. 6 illustrates an embodiment of operations to handle a detected failure.

FIG. 6 illustrates an embodiment of operations performed by the monitor system 16 to handle a failure communicated by the host 26 or primary control unit 28a . . . 28n operating systems. Upon receiving (at block 150) information of a failure at a primary site (e.g., primary control unit or storage) from the host 26 or control unit 28 . . . 28n operating system, the monitor system 16 issues commands to quiesce (at block 152) I/O requests to the primary storage 6a . . . 6n volumes. This command to quiesce may be provided to the primary control units 4a . . . 4n and/or the hosts 14. The monitor system 16 then suspends (at block 154) the copying of updates to all primary storage locations to the secondary storage locations in a consistency group including the storage locations affected by the failure. The monitor system 16 may cause the suspension by sending commands to the SDMs 8a . . . 8n to suspend forming consistency groups including the primary storage 6a volumes or data sets for which failure was detected, so that any updates occurring after the failure is detected are not propagated to the secondary storages 12a . . . 12n. However, already formed consistency groups in the journals 22a . . . 22n may be copied over to the secondary storages 12a . . . 12n.

In certain embodiments, the suspension may apply to all data that is dependent upon the primary storage 6a . . . 6n volumes subject to the failure condition or which the primary storage 6a . . . 6n volumes subject to the failure depend. This dependent data may comprise all data that is in the consistency group including the primary volumes subject to the failure condition, i.e., that have themselves failed or cannot be accessed due to a failure in a component connecting the host 14 to the primary storages 6a . . . 6n. Further, the dependent data may comprise volumes in other sessions whose consistency is maintained through the master data set 20. Thus, the suspension may be issued with respect to all volumes in all sessions whose consistency is maintained with the failed volumes through the master data set 20. Mirroring operations may continue to be performed with respect to those volumes not dependent on or within the consistency group of the volumes subject to the failure condition while other volumes are subject to the suspension.

After suspending I/O to the volumes in the consistency group including the volumes subject to the failure condition, the monitor system 16 may issue commands (at block 156) to the primary control units 4a . . . 4n and host 14 to allow I/O requests to proceed against the primary storage 6a . . . 6n locations. At this point, the failure message may be provided (at block 158) to the application 24. However, since the mirroring of updates has been suspended, any error condition the application 24 writes to a primary storage 6a . . . 6n, e.g., the database application 40 writing to the exception table 44 (FIG. 2), is not propagated to the secondary storage 12a . . . 12n. At this point, the primary control units 4a . . . 4n maintain bitmaps for each volume to keep track of updates to the suspended primary storage 6a . . . 6n locations.

Figure 7:
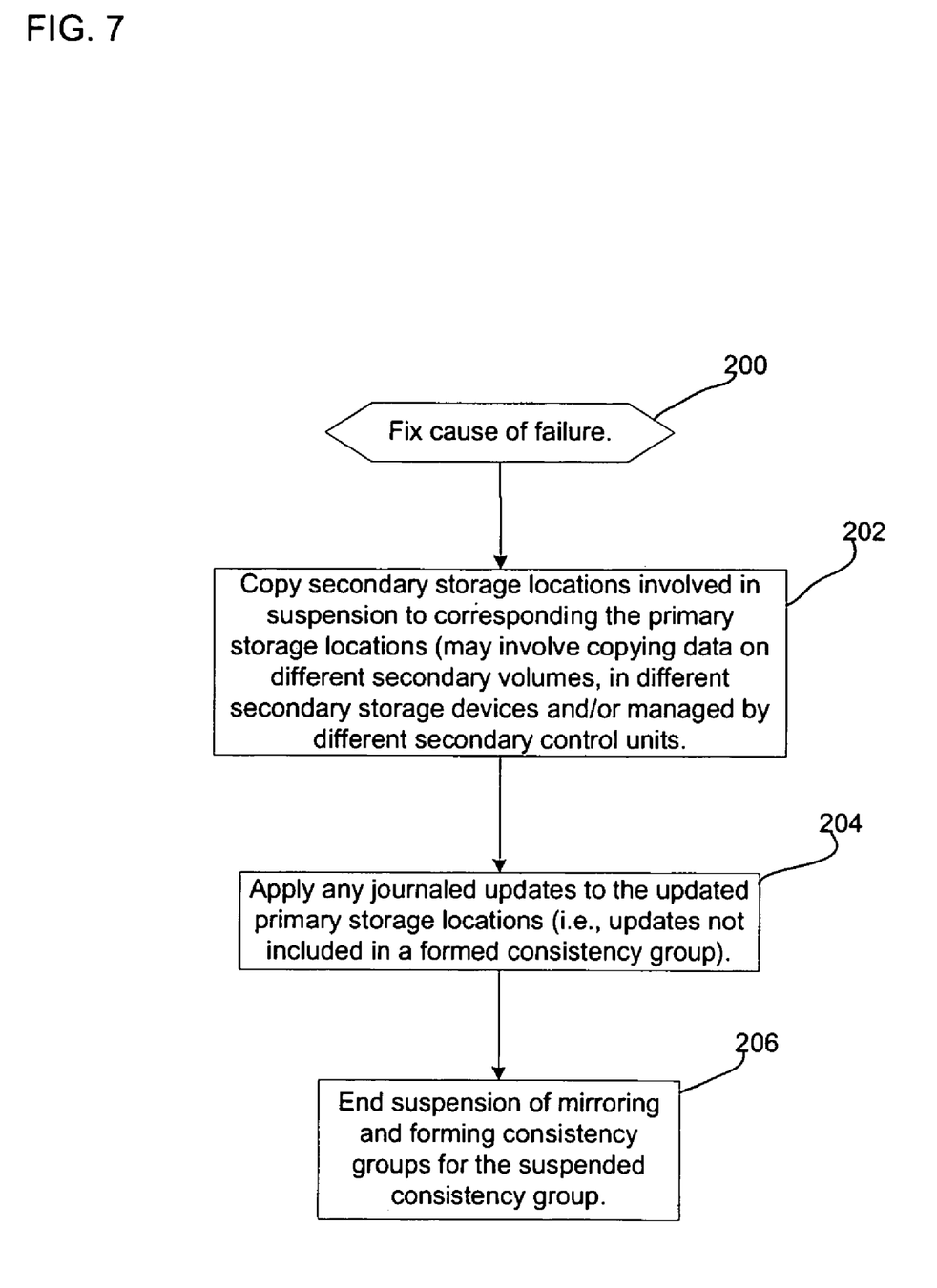
FIG. 7 illustrates an embodiment of operations to perform data recovery from the mirrored secondary storage.

FIG. 7 illustrates operations to copy the data in the secondary storage 12a . . . 12n, which does not reflect the exceptions, to the primary storage 6a . . . 6n after the failure that initiated the failure message resulting in the operations of FIG. 5 is addressed. At block 200, the cause of the failure is fixed, which may involve servicing components in the network 2, host 14, primary control unit 4a . . . 4n, primary storage 6a . . . 6n, etc. After the failure is addressed, the monitor system 16 or administrator may initiate (at block 202) a recovery operation to copy all secondary volumes or data sets involved in the suspension to the corresponding the primary storage 6a . . . 6n locations. This may involve copying data from secondary volumes in different secondary storage devices, managed by different secondary control units and/or in different sessions. After the data is recovered from the secondary sites, any journaled updates to the suspended primary storage 6a . . . 6n locations are applied (at block 204) to the updated primary storage locations (i.e., updates not included in a formed consistency group). These may comprise updates in the journals 22a . . . 22n not included in a consistency group or updates maintained in a side file of the primary control units 4a . . . 4n. The suspension of mirroring and forming consistency groups for the suspended volumes is ended (at block 206) and mirror operations may continue.

With the described embodiments, indication of a failure, such as an exception written to the exception table 44 in a primary storage 6b is not propagated to the secondary storage 6b where related user data in another secondary storage 6a, e.g., the mirrored tablespace 42, may not have any errors. If the exception was propagated to the exception table being mirrored in the corresponding secondary storage 12b, then the administrator would have to perform error recovery operations at the secondary storage 12b to clear the error before recovering the tablespace 42 (FIG. 2) in the primary storage 6a from the secondary storage 12a. However, because the described embodiments prevent the exception from being propagated to the mirrored exception table 44, no recovery operations need be performed at the secondary site to clear a propagated exception. In this way, the described embodiments reduce downtime and simplify the failure recovery process.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining a copy relationship between primary and secondary storage locations, wherein updates to the primary storage locations are copied to the secondary storage locations;
    detecting a failure preventing an application from writing updates to a first set of the primary storage locations, wherein the first set of primary storage locations and a second set of primary storage locations are in one consistency group;
    receiving a failure message for the application in response to detecting the failure, wherein the failure message is not provided to the application;
    suspending the copying of updates to the primary storage locations to the secondary storage locations, wherein the suspension of copying of updates applies to copying updates to the first and second sets of primary storage locations to a corresponding first and second sets of secondary storage locations, and wherein the suspension of copying does not apply to copying updates to a third set of primary storage locations to a corresponding third set of secondary storage locations, wherein the third set of primary storage locations are not in the consistency group including the first and second sets of primary storage locations; and
    providing the failure message to the application in response to suspending the copying.

2. The method of claim 1, wherein a data mover asynchronously copies updates to the primary storage locations to the secondary storage locations in the relationship.

3. The method of claim 1, wherein the detected failure comprises a failure of at least one of a storage device in which the primary storage locations are configured, a control unit providing access to the storage device, or a component in a fabric providing communication between the application and the storage device.

4. The method of claim 1, wherein the failure message is generated by a host operating system including the application or a control unit operating system managing access to the primary storage locations.

5. The method of claim 1, wherein the primary and secondary storage locations comprise first primary and secondary storage locations, wherein the application further writes exception information to second primary storage locations that is copied to second secondary storage locations, wherein the detected failure comprises a failure related to an accessibility of the first primary storage locations, and wherein suspending the copying of updates prevents information on the detected failure written to the exception information in the second primary storage locations from being copied to the second secondary storage locations.

6. The method of claim 1, wherein updates not copied from the primary storage locations to the secondary storage locations are journaled during the suspension, further comprising:
    performing a data recovery operation by copying the data at the secondary storage locations to primary storage locations; and
    applying the journaled updates to the primary storage locations in response to copying the data at the secondary storage locations to the primary storage locations.

7. The method of claim 1, wherein the first and second set of primary and secondary storage locations comprise different sessions, wherein a first data mover is used to copy updates to the first set of primary storage locations to the first set of secondary storage locations and wherein a second data mover is used to copy updates to the second set of primary storage locations to the second set of secondary storage locations.

8. The method of claim 1, further comprising:
    quiescing I/O requests to the primary storage locations in response to detecting the failure;
    allowing I/O requests to proceed against the primary storage locations in response to suspending the copying of the updates; and
    indicating updates to the primary storage locations in response to allowing the I/O requests to proceed while the copying of the updates is suspended.

9. The method of claim 1, wherein information related to the failure message is written to the primary storage locations during the suspension but is not copied to the secondary storage locations, wherein the secondary storage locations do not include the information related to the failure message written to the primary storage locations.

10. A system in communication with primary and secondary storage locations, wherein a copy relationship indicates updates to the primary storage locations that are copied to the secondary storage locations comprising:
    a processor; and
    a computer readable storage medium including code executed by the processor to perform operations, the operations comprising:

maintaining a copy relationship between primary and secondary storage locations, wherein updates to the primary storage locations are copied to the secondary storage locations;

detecting a failure preventing an application from writing updates to a first set of the primary storage locations, wherein the first set of primary storage locations and a second set of primary storage locations are in one consistency group;

receiving a failure message for the application in response to detecting the failure, wherein the failure message is not provided to the application;

suspending the copying of updates to the primary storage locations to the secondary storage locations, wherein the suspension of copying of updates applies to copying updates to the first and second sets of primary storage locations to a corresponding first and second sets of secondary storage locations, and wherein the suspension of copying does not apply to copying updates to a third set of primary storage locations to a corresponding third set of secondary storage locations, wherein the third set of primary storage locations are not in the consistency group including the first and second sets of primary storage locations; and providing the failure message to the application in response to suspending the copying.

11. The system of claim 10, wherein a data mover asynchronously copies updates to the primary storage locations to the secondary storage locations in the relationship.

12. The system of claim 10, wherein the detected failure comprises a failure of at least one of a storage device in which the primary storage locations are configured, a control unit providing access to the storage device, or a component in a fabric providing communication between the application and the storage device.

13. The system of claim 10, wherein the failure message is generated by a host operating system including the application or a control unit operating system managing access to the primary storage locations.

14. The system of claim 10, wherein the primary and secondary storage locations comprise first primary and secondary storage locations, wherein the application further writes exception information to second primary storage locations that is copied to second secondary storage locations, wherein the detected failure comprises a failure related to an accessibility of the first primary storage locations, and wherein suspending the copying of updates prevents information on the detected failure written to the exception information in the second primary storage locations from being copied to the second secondary storage locations.

15. The system of claim 10, wherein updates not copied from the primary storage locations to the secondary storage locations are journaled during the suspension, wherein the operations further comprise:

performing a data recovery operation by copying the data at the secondary storage locations to primary storage locations; and applying the journaled updates to the primary storage locations in response to copying the data at the secondary storage locations to the primary storage locations.

16. The system of claim 10, wherein the first and second set of primary and secondary storage locations comprise different sessions, wherein a first data mover is used to copy updates to the first set of primary storage locations to the first set of secondary storage locations and wherein a second data mover is used to copy updates to the second set of primary storage locations to the second set of secondary storage locations.

17. The system of claim 10, wherein the operations further comprise:

quiescing I/O requests to the primary storage locations in response to detecting the failure;

allowing I/O requests to proceed against the primary storage locations in response to suspending the copying of the updates; and indicating updates to the primary storage locations in response to allowing the I/O requests to proceed while the copying of the updates is suspended.

18. The system of claim 10, wherein information related to the failure message is written to the primary storage locations during the suspension but is not copied to the secondary storage locations, wherein the secondary storage locations do not include the information related to the failure message written to the primary storage locations.

19. An article of manufacture comprising a computer readable storage medium including code executed to communicate with a primary and secondary storage locations, wherein a copy relationship indicates updates to the primary storage locations that are copied to the secondary storage locations, and wherein the code is executed to perform operations, the operations comprising:

maintaining a copy relationship between primary and secondary storage locations, wherein updates to the primary storage locations are copied to the secondary storage locations;

detecting a failure preventing an application from writing updates to a first set of the primary storage locations, wherein the first set of primary storage locations and a second set of primary storage locations are in one consistency group;

receiving a failure message for the application in response to detecting the failure, wherein the failure message is not provided to the application;

suspending the copying of updates to the primary storage locations to the secondary storage locations, wherein the suspension of copying of updates applies to copying updates to the first and second sets of primary storage locations to a corresponding first and second sets of secondary storage locations, and wherein the suspension of copying does not apply to copying updates to a third set of primary storage locations to a corresponding third set of secondary storage locations, wherein the third set of primary storage locations are not in the consistency group including the first and second sets of primary storage locations; and providing the failure message to the application in response to suspending the copying.

20. The article of manufacture of claim 19, wherein a data mover asynchronously copies updates to the primary storage locations to the secondary storage locations in the relationship.

21. The article of manufacture of claim 19, wherein the detected failure comprises a failure of at least one of a storage device in which the primary storage locations are configured, a control unit providing access to the storage device, or a component in a fabric providing communication between the application and the storage device.

22. The article of manufacture of claim 19, wherein the failure message is generated by a host operating system including the application or a control unit operating system managing access to the primary storage locations.

23. The article of manufacture of claim 19, wherein the primary and secondary storage locations comprise first primary and secondary storage locations, wherein the application further writes exception information to second primary storage locations that is copied to second secondary storage locations, wherein the detected failure comprises a failure related to an accessibility of the first primary storage locations, and wherein suspending the copying of updates prevents information on the detected failure written to the exception information in the second primary storage locations from being copied to the second secondary storage locations.

24. The article of manufacture of claim 19, wherein updates not copied from the primary storage locations to the secondary storage locations are journaled during the suspension, wherein the operations further comprise:
   performing a data recovery operation by copying the data at the secondary storage locations to primary storage locations; and
   applying the journaled updates to the primary storage locations in response to copying the data at the secondary storage locations to the primary storage locations.

25. The article of manufacture of claim 19, wherein the first and second set of primary and secondary storage locations comprise different sessions, wherein a first data mover is used to copy updates to the first set of primary storage locations to the first set of secondary storage locations and wherein a second data mover is used to copy updates to the second set of primary storage locations to the second set of secondary storage locations.

26. The article of manufacture of claim 19, wherein the operations further comprise:
   quiescing I/O requests to the primary storage locations in response to detecting the failure;
   allowing I/O requests to proceed against the primary storage locations in response to suspending the copying of the updates; and
   indicating updates to the primary storage locations in response to allowing the I/O requests to proceed while the copying of the updates is suspended.

27. The article of manufacture of claim 19, wherein information related to the failure message is written to the primary storage locations during the suspension but is not copied to the secondary storage locations, wherein the secondary storage locations do not include the information related to the failure message written to the primary storage locations.

* * * * *

UNITED STATES PATENT AND TRADEMARK OFFICE
CERTIFICATE OF CORRECTION

PATENT NO. : 7,627,775 B2 Page 1 of 1
APPLICATION NO. : 11/302348
DATED : December 1, 2009
INVENTOR(S) : Kern et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Twenty-first Day of December, 2010

David J. Kappos
*Director of the United States Patent and Trademark Office*